Patented Jan. 20, 1942

2,270,379

UNITED STATES PATENT OFFICE 2,270,379

SUGAR DERIVATIVES OF COMPOUNDS OF THE SUPRARENAL CORTICAL HORMONE SERIES AND PROCESS OF MAKING THE SAME

Karl Miescher, Riehen, and Werner Fischer, Basel, Switzerland, assignors, by mesne assignments, to Ciba Pharmaceutical Products, Incorporated, Summit, N. J., a corporation of New Jersey No Drawing. Application February 20, 1939, Serial No. 257,545. In Switzerland February 23, 1938

7 Claims. (Cl. 260—210)

This invention relates to the manufacture of new derivatives of compounds of the suprarenal cortical hormone series by treating such compounds with etherifying sugar derivatives in the presence of a catalyst useful in furthering etherification.

As parent material may be used any compound of the suprarenal cortical hormone series. All these compounds are characterized by a ketol grouping in 17-position of the cyclopentanopolyhydrophenanthrene skeleton. In particular the following may be named:

$\Delta^4$-21-oxy-pregnene-dione-(3,20)
$\Delta^4$-3,21-dioxy-pregnene-one-(20)
$\Delta^4$-11,21-dioxy-pregnene-dione-(3,20)
$\Delta^4$-11-keto-21-oxy-pregnene-dione-(3,20)
$\Delta^4$-17,21-dioxy-pregnene-dione-(3,20)
$\Delta^4$-11,17,21-trioxy-pregnene-dione-(3,20)
$\Delta^4$-11-keto-17,21-dioxy-pregnene-dione-(3,20).

As saccharides there may be used for instance mono-, di- or trisaccharides, such as glucoses, galactoses and galactose-glucoses.

The methods adopted in the invention may be such as is described for example in Richter-Anschütz, Chemie der Kohlenstoffverbindungen, vol. 2, first half, page 359 (1935). This text-book describes for example the action of hydrochloric acid on alcoholic sugar solutions, the reaction of alcohols with 1:2-oxides of sugars, and the manufacture of phenolglycosides from phenols and sugar acetates by zinc chloride or para-toluene sulfonic acid. But also other known catalysts furthering the etherification may be used, for example silver oxide, silver carbonate, mercury salts such as mercury oxide, mercury acetate (cf. "Berichte" vol. 62, page 990 (1929)) and mercury succinate, emulsion and the glucosidase of yeast.

The new compounds may have one or more saccharide residues in the molecule, and in addition hydroxyl groups which may be free or esterified or etherified. The saccharide residues may alternatively be present in the form of derivatives, for instance in the form of their acylates. The new compounds are characterized by their good solubility in water. They are useful in therapeutics.

The following examples illustrate the invention, the parts being by weight:

Example 1

A mixture of 1 part of $\Delta^4$-21-oxy-pregnene-dione-(3,20), 2 parts of acetobromoglucose and 2 parts of dry silver oxide are shaken together in 200 parts of absolute ether at room temperature for 60 hours. The silver oxide mud separated by filtration is boiled for some time with fresh ether and the united ethereal solutions are washed with dilute nitric acid and water. From the strongly concentrated ethereal solution the tetracetyl-glucoside separates in the form of a white crystalline mass. It can be recrystallized from dilute alcohol F. 175–176° C.

For saponification the tetracetyl-glucoside is heated with 10 parts of ethanol and mixed with an alcoholic solution of sodium ethylate. After carefully diluting with water and immediately neutralizing with dilute acetic acid, the product is evaporated to dryness. The residue is redissolved from little ethanol or methanol and the desired $\Delta^4$-21-($\beta$-glucosido)-pregnene-dione-(3,20) is obtained in the form of a white powder. The saponification may also be effected with other hydrolizing agents, for example sodium hydroxide.

The same product is equally well obtained by starting from another derivative of glucose, for example pentacetyl-glucose.

In similar manner the glucosides of other compounds of the suprarenal cortical hormone series may be made. For example, starting from $\Delta^4$-3,21-dioxy-pregnene-one-(20), $\Delta^4$-11,21-dioxy-pregnene-dione-(3,20), $\Delta^4$-17,21-dioxy-pregnene-dione-(3,20), $\Delta^4$-11-keto-17,21-dioxy-pregnene-dione-(3,20), or $\Delta^4$-11,17,21-trioxy-pregnene-dione-(3,20), there is obtained a corresponding derivative having two respectively three glucose residues in the molecule.

Other catalysts furthering etherification may be used for instance in organic acids such as hydrochloric acid, para-toluene sulfonic acid, zinc chloride, mercury salts, such as mercury acetate, mercury oxide and mercury succinate, emulsin or the glucosidase of yeast.

As etherifying sugar derivatives there may be used in a quite analogous manner, instead of mono-saccharide derivatives, also derivatives of di- and trisaccharides, for example of galactose or galactose-glucoses, and of other polysaccharides.

Example 2

1 part of $\Delta^4$-21-oxypregnene-dione-(3,20), 2 parts of acetobromolactose and 0.5 part of mercury acetate are mixed with 100 parts of absolute benzene, and the mixture is boiled for some time. The benzene solution is worked up in the manner described in Example 1. By evaporating the solvent the desired heptacetyl lactoside is obtained, and by saponification of this the $\Delta^4$-21-($\beta$-lactosido)-pregnene-dione-(3,20) which is well soluble in water and may be recrystallized from aqueous ethanol or methanol is obtained.

By reaction of oxypregnene-dione with acetobromo-(6-gentiobiosido-d-glucose) there may be made by an analogous operation the corresponding trisaccharide.

What we claim is:

1. A process for the manufacture of new derivatives of compounds of the suprarenal cortical hormone series, comprising treating $\Delta^4$-21-oxy-pregnene-dione-(3,20) with acetobromoglucose in contact with silver oxide.

2. A process for the manufacture of new derivatives of compounds of the suprarenal cortical hormone series, comprising treating $\Delta^4$-21-oxy-pregnene-dione-(3,20) with acetobromoglucose in contact with silver oxide and then treating the product thus obtained with hydrolizing agents.

3. A process for the manufacture of new derivatives of compounds of the suprarenal cortical hormone series, comprising treating $\Delta^4$-21-oxy-pregnene-dione-(3,20) with acetobromoglucose in contact with silver oxide and then treating the product thus obtained with sodium ethylate.

4. The mono-saccharide derivative of $\Delta^4$-21-oxy-pregnene-dione-(3,20).

5. The $\beta$-glucoside of $\Delta^4$-21-oxy-pregnene-dione-(3,20).

6. The sugar derivatives of compounds selected from the group consisting of $\Delta^4$-21-oxy-pregnene-dione-(3,20); $\Delta^4$-3,21-dioxy-pregnene-one-(20); $\Delta^4$-11,21-dioxy-pregnene-dione-(3,20); $\Delta^4$-11-keto-21-oxy-pregnene-dione-(3,20); $\Delta^4$-17,21-dioxy-pregnene-dione-(3,20); $\Delta^4$-11,17,21-trioxy-pregnene-dione-(3,20); and $\Delta^4$-11-keto-17,21-dioxy-pregnene-dione-(3,20), and which are characterized by their solubility in water.

7. The monosaccharide derivatives of compounds selected from the group consisting of $\Delta^4$-21-oxy-pregnene-dione-(3,20); $\Delta^4$-3,21-dioxy-pregnene-one-(20); $\Delta^4$-11,21-dioxy-pregnene-dione-(3,20); $\Delta^4$-11-keto-21-oxy-pregnene-dione-(3,20); $\Delta^4$-17,21-dioxy-pregnene-dione-(3,20); $\Delta^4$-11,17,21-trioxy-pregnene-dione-(3,20); and $\Delta^4$-11-keto-17,21-dioxy-pregnene-dione-(3,20), and which are characterized by their solubility in water.

KARL MIESCHER.
WERNER FISCHER.